United States Patent
Saka et al.

(10) Patent No.: US 9,287,554 B2
(45) Date of Patent: Mar. 15, 2016

(54) POSITIVE ELECTRODE ACTIVE MATERIAL

(75) Inventors: Maiko Saka, Tsukuba (JP); Cedric Pitteloud, Saintlouis (FR); Tetsuri Nakayama, Tsukuba (JP); Kenji Takamori, Tsukuba (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 28 days.

(21) Appl. No.: 13/819,479

(22) PCT Filed: Aug. 22, 2011

(86) PCT No.: PCT/JP2011/069361
§ 371 (c)(1),
(2), (4) Date: Feb. 27, 2013

(87) PCT Pub. No.: WO2012/029673
PCT Pub. Date: Mar. 8, 2012

(65) Prior Publication Data
US 2013/0164623 A1    Jun. 27, 2013

(30) Foreign Application Priority Data

| Sep. 2, 2010 | (JP) | 2010-196397 |
| Sep. 2, 2010 | (JP) | 2010-196398 |
| Jun. 29, 2011 | (JP) | 2011-143894 |
| Jul. 15, 2011 | (JP) | 2011-156388 |

(51) Int. Cl.
*H01M 4/131* (2010.01)
*H01M 4/505* (2010.01)
*H01M 4/525* (2010.01)
*C01G 53/00* (2006.01)

(52) U.S. Cl.
CPC .............. *H01M 4/131* (2013.01); *C01G 53/50* (2013.01); *H01M 4/505* (2013.01); *H01M 4/525* (2013.01); *C01P 2002/76* (2013.01); *C01P 2006/12* (2013.01); *Y02E 60/122* (2013.01)

(58) Field of Classification Search
CPC .... C01G 53/50; C01P 2006/12; H01M 4/131; H01M 4/505
USPC ........................................................ 429/223
See application file for complete search history.

(56) References Cited

U.S. PATENT DOCUMENTS

| 6,365,299 | B1 | 4/2002 | Miyaki et al. | |
| 6,383,235 | B1 | 5/2002 | Maegawa et al. | |
| 7,105,251 | B2 | 9/2006 | Miyaki et al. | |
| 2007/0009801 | A1* | 1/2007 | Inagaki et al. | 429/231.95 |
| 2008/0254365 | A1* | 10/2008 | Kim et al. | 429/221 |
| 2010/0219370 | A1 | 9/2010 | Nakamura et al. | |
| 2011/0291055 | A1 | 12/2011 | Kojima et al. | |
| 2012/0015231 | A1 | 1/2012 | Takamori et al. | |

FOREIGN PATENT DOCUMENTS

| CN | 1893167 | A |   | 1/2007 |
| CN | 101278424 |   |   | 10/2008 |
| CN | 101286561 | A |   | 10/2008 |
| JP | 6-243897 | A |   | 9/1994 |
| JP | 9-283179 | A |   | 10/1997 |
| JP | 11-001323 | A |   | 1/1999 |
| JP | 2000-260432 | A |   | 9/2000 |
| JP | 2005-075691 | A |   | 3/2005 |
| JP | 2005-187282 | A |   | 7/2005 |
| JP | 2006-12855 | A |   | 1/2006 |
| JP | 2006-278341 | A |   | 10/2006 |
| JP | 2006278341 | A | * | 10/2006 |
| JP | 2008-103344 | A |   | 5/2008 |
| JP | 2012-124147 | A |   | 6/2012 |
| WO | 98/29915 | A1 |   | 7/1998 |
| WO | 2010/089931 | A1 |   | 8/2010 |

OTHER PUBLICATIONS

Communication from the Chinese Patent Office issued Aug. 5, 2014 in a counterpart Chinese Patent Application No. 201180041937.8.
Notice of Reasons for Rejection issued Jan. 20, 2015, in corresponding Japanese Patent Application No. 2011-185761 with English translation.
Third Office Action issued on May 19, 2015 in Chinese patent application No. 201180041937.8 with English translation.
Notice of Reasons for Rejection dated Apr. 28, 2015 issued by Japanese Patent Office in application No. 2011-156388 with English translation.
Second Office Action issued on Feb. 10, 2015, in Chinese Patent Application No. 201180041937.8 with English translation.
Notice of Reasons for Rejection issued Dec. 18, 2015 in corresponding Japanese Patent Application No. 2011-156388 with translation.

* cited by examiner

*Primary Examiner* — Jonathan Jelsma
*Assistant Examiner* — Rashid Alam
(74) *Attorney, Agent, or Firm* — Sughrue Mion, PLLC

(57) ABSTRACT

The present invention provides a positive electrode active material. The positive electrode active material is represented by the following formula (I) and has a BET specific surface area of larger than 5 m²/g and not larger than 15 m²/g:

$$Li_xM^1{}_yM^3{}_{1-y}O_2 \qquad (I)$$

wherein $M^1$ is at least one transition metal element selected from Group 5 elements and Group 6 elements of the Periodic Table, $M^3$ is at least one transition metal element other than $M^1$ and selected from among transition metal elements excluding Fe, x is not less than 0.9 and not more than 1.3, and y is more than 0 and less than 1.

3 Claims, No Drawings

POSITIVE ELECTRODE ACTIVE MATERIAL

CROSS REFERENCE TO RELATED APPLICATIONS

This application is a National Stage of International Application No. PCT/JP2011/069361, filed on Aug. 22, 2011, which claims priority from Japanese Patent Application Nos. 2010-196398, 2010-196397, both filed on Sep. 2, 2010, Japanese Patent Application No. 2011-143898, filed on Jun. 29, 2011 and Japanese Patent Application No. 2011-156388, filed on Jul. 15, 2011, the contents of all of which are incorporated herein by reference in their entirety.

TECHNICAL FIELD

The present invention relates to a positive electrode active material and particularly to a positive electrode active material to be used for a nonaqueous electrolyte secondary battery.

BACKGROUND ART

Lithium mixed metal oxides have been used as positive electrode active materials for nonaqueous electrolyte secondary batteries, particularly as positive electrode active materials for lithium secondary batteries. Lithium secondary batteries have already been used practically as small-sized power sources for cellular phone application, notebook computer application, and so on, and moreover their application has been attempted also in medium-sized or large-sized power sources for automobile application, electric power storage application, and so on.

As a conventional lithium mixed metal oxide, a lithium-nickel-manganese mixed oxide having a layered structure is disclosed in Patent Document 1. It has been reported therein that mixed oxides were obtained by mixing a transition metal mixed compound obtained by a coprecipitation method with lithium hydroxide and calcining the mixture in the air at 900° C. for 12 hours.

Patent Document 2 discloses a lithium-nickel-manganese mixed oxide and a lithium-cobalt-manganese mixed oxide. It has been reported therein that a mixed oxide was obtained by heat-treating a precursor of a mixed oxide where the precursor was obtained using a spray drying process.

PRIOR ART DOCUMENTS

Patent Documents

Patent Document 1: JP-A-2005-187282
Patent Document 2: WO 98/29915

DISCLOSURE OF THE INVENTION

However, nonaqueous electrolyte secondary batteries using the above-mentioned lithium mixed metal oxides as a positive electrode active material are not satisfactory in cycling characteristics. The object of the present invention is to provide a positive electrode active material capable of affording a nonaqueous electrolyte secondary battery superior in cycling characteristics.

The present invention provides the following.

<1> A positive electrode active material that is represented by the following formula (I) and has a BET specific surface area of larger than 5 m²/g and not larger than 15 m²/g:

$$Li_xM^1{}_yM^3{}_{1-y}O_2 \quad (I)$$

wherein $M^1$ is at least one transition metal element selected from Group 5 elements and Group 6 elements of the Periodic Table, $M^3$ is at least one transition metal element other than $M^1$ and selected from among transition metal elements excluding Fe, x is not less than 0.9 and not more than 1.3, and y is more than 0 and less than 1.

<2> The positive electrode active material according to <1>, wherein $M^1$ is V (vanadium).

<3> The positive electrode active material according to <1> or <2>, wherein $M^3$ is at least one transition metal element selected from the group consisting of Ni, Co, and Mn.

<4> The positive electrode active material according to any one of <1> to <3>, wherein y is more than 0 and not more than 0.03.

<5> The positive electrode active material according to any one of <1> to <4>, wherein y is more than 0 and not more than 0.01.

<6> A positive electrode comprising the positive electrode active material according to any one of <1> to <5>.

<7> nonaqueous electrolyte secondary battery comprising the positive electrode according to <6>.

MODE FOR CARRYING OUT THE INVENTION

<Positive Electrode Active Material>

The positive electrode active material of the present invention is represented by the following formula (I) and has a BET specific surface area of larger than 5 m²/g and not larger than 15 m²/g:

$$Li_xM^1{}_yM^3{}_{1-y}O_2 \quad (I)$$

wherein $M^1$ is at least one transition metal element selected from Group 5 elements and Group 6 elements of the Periodic Table, $M^3$ is at least one transition metal element other than $M^1$ and selected from among transition metal elements excluding Fe, x is not less than 0.9 and not more than 1.3, and y is more than 0 and less than 1.

The above-mentioned $M^1$ is preferably one or more transition metal elements selected from the group consisting of V, Nb, Ta, Cr, Mo, and W; in order to increase the discharge capacitance of a nonaqueous electrolyte secondary battery to be obtained, the $M^1$ is more preferably one or more transition metal elements selected from the group consisting of V, Nb, Cr, Mo, and W, and V is even more preferable.

The above-mentioned $M^3$ is one or more transition metal element other than $M^1$ and selected from among transition metal elements excluding Fe. In terms of discharge capacitance per unit weight of a positive electrode active material, the $M^3$ is preferably one or more elements selected from the group consisting of Mn, Co, and Ni.

Preferably, the BET specific surface area of the positive electrode active material is not smaller than 6 m²/g and not larger than 13 m²/g because this results in higher cycling characteristics. The case that the BET specific surface area is 5 m²/g or smaller is undesirable in terms of output performance at a high current rate, whereas the case of exceeding 15 m²/g is undesirable in terms of the packing property of the positive electrode active material.

Preferably, y is more than 0 and not more than 0.03, more preferably more than 0 and not more than 0.01 because, if so, higher cycling characteristics are obtained.

The above-described positive electrode active material is useful for nonaqueous electrolyte secondary batteries excellent in cycling characteristics.

The above-described transition metal elements in the positive electrode active material may be replaced partially by other elements without remarkably destroying the effect of the present invention. Examples of such other elements include such elements as B, Al, Ga, In, Si, Ge, Sn, and Mg.

To the surface of a particle of the positive electrode active material may be adhered a compound other than the active material without remarkably destroying the effect of the present invention. Examples of the compound include compounds containing one or more elements selected from the group consisting of B, Al, Ga, In, Si, Ge, Sn, Mg, and transition, metal elements, preferably compounds containing one or more elements selected from the group consisting of B, Al, Mg, Ga, In, and Sn, more preferably compounds containing Al; specific examples of the compound include oxides, hydroxides, oxyhydroxides, carbonates, nitrates, and organic acid salts of the above-mentioned elements, and preferred are oxides, hydroxides, or oxyhydroxides. These compounds may be used in admixture. Of among these compounds, a particularly preferable compound is alumina. The adhesion may be followed by heating.

<Method for Producing of Positive Electrode Active Material—Method 1>

The positive electrode active material can be produced using the following Method 1.

Method 1:

A method comprising the step of dissolving lithium element, $M^1$ ($M^1$ is one or more transition metal elements selected from the Group 5 elements and the Group 6 elements of the Periodic Table), and $M^2$ ($M^2$ is one or more transition metal elements selected from transition metal elements excluding $M^1$) in water to obtain an aqueous solution, and the step of removing moisture of the aqueous solution by spray drying.

According to Method 1, it is possible to obtain a positive electrode active material capable of affording a nonaqueous electrolyte secondary battery having improved cycling characteristics. A positive electrode active material of the present invention can be produced by using $M^3$ instead of $M^2$ in Method 1.

The aqueous solution in Method 1 can be obtained by mainly using water as a solvent and dissolving lithium element, and $M^1$ and $M^2$ in the solvent. The aqueous solution may contain sol.

The ambient temperature for the spray drying is preferably within the range of 20 to 400° C. The ambient temperature for the spray drying is more preferably 80° C. or more, even more preferably 100° C. or more because such temperatures reduce leaving of water of crystallization or moisture absorption. The ambient temperature for the spray drying is preferably not higher than 380° C., more preferably not higher than 350° C. because such temperatures can provide a positive electrode active material with more increased uniformity.

In Method 1, a dry matter (positive electrode active material) is obtained by removing the moisture of an aqueous solution by spray drying. Preferably, Method 1 further comprises a step of heat-treating the dry matter obtained after removing the moisture. From the viewpoint of increasing the crystallinity of a positive electrode active material and the viewpoint of improving the cycling characteristics of a nonaqueous electrolyte secondary battery, the heat treatment is preferably heating at within the temperature range of 100 to 1000° C., more preferably heating at within the temperature range of 600 to 900° C. The time for which the dry matter is maintained at the heating temperature is usually 0.1 to 20 hours, and preferably 0.5 to 8 hours. The temperature ramp-up rate to the heating temperature is usually 50 to 400° C./hour and the temperature ramp-down rate from the heating temperature to room temperature is usually 10 to 400° C./hour. It is also permissible that after the heating at a temperature at within the range of 100 to 200° C., heating is performed again at a temperature higher than that temperature. While air, oxygen, nitrogen, argon, or mixed gas thereof can be used as the atmosphere for the heat treatment, air atmosphere is preferred.

It is permissible to grind the positive electrode active material with a ball mill, a jet mill, or the like and it is also permissible to repeat grinding and heat treatment each twice or more. It is also permissible to wash or classify the positive electrode active material according to need.

The $M^1$ is preferably one or more transition metal elements selected from the group consisting of V, Nb, Ta, Cr, Mo, and W; in order to increase the discharge capacitance of a nonaqueous electrolyte secondary battery to be obtained, one or more transition metal elements selected from the group consisting of V, Nb, Cr, Mo, and W are more preferred, and V is even more preferred.

The $M^2$ is one or more transition metal elements selected from the transition metal elements excluding the $M^1$ and preferably comprises one or more elements selected from the group consisting of Mn, Co, and Ni.

Lithium hydroxide, lithium hydroxide monohydrate, and lithium carbonate are used suitably as the source of the lithium elements in Method 1, and examples of the source of the $M^1$ and the $M^2$ include oxides, hydroxides (including oxyhydroxides; the same shall apply hereinafter), chlorides, carbonates, sulfates, nitrates, oxalates, and acetates. Two or more of these may be mixed together. When a raw material hardly dissolves in water, it is permissible to dissolve the raw material in an aqueous acid solution or the like to prepare an aqueous solution. Preferably, the aqueous solution in Method 1 further contains an organic acid.

In Method 1, while the organic acid is not particularly restricted as long as it is an acid that can form a complex with lithium element and a transition metal element and can dissolve in water, it is preferably one or more acids of the following: oxalic acid, tartaric acid, citric acid, succinic acid, malonic acid, and maleic acid; a complex can thereby be obtained easily and a positive electrode active material can be produced with sufficient mass productivity.

The BET specific surface area, size, and shape of the positive electrode active material can be controlled by controlling the conditions of the spray drying of the above-mentioned aqueous solution.

<Method for Producing of Positive Electrode Active Material—Method 2>

The positive electrode active material can also be produced using the following Method 2.

Method 2:

A method comprising a step of calcining a mixture of a lithium compound and a raw material comprising $M^{11}$ ($M^{11}$ is one or more elements selected from the group consisting of Al, Mg, Ca, Zn, Si, Sn, and V) and $M^{21}$ ($M^{21}$ is one or mare transition metal elements other than $M^{11}$ and selected from transition metal elements excluding Fe in the presence of an inactive flux.

According to Method 2, it is possible to obtain a positive electrode active material capable of affording a nonaqueous electrolyte secondary battery having improved discharge capacitance and cycling characteristics. A positive electrode active material of the present invention can be produced by using $M^1$ instead of $M^{11}$, and $M^3$ instead of $M^{21}$ in Method 2.

Lithium hydroxide, lithium hydroxide monohydrate, and lithium carbonate are preferred as the lithium compound to be used in Method 2. Examples of the raw material comprising $M^{11}$ and $M^{21}$ include oxide, hydroxides (including oxyhydroxides; the same shall apply hereinafter), chlorides, carbonates, sulfates, nitrates, oxalates, and acetates. Two or more of these may be mixed together. The raw material containing $M^{11}$ and $M^{21}$ can also be obtained by coprecipitation.

The inactive flux in Method 2 is an agent that hardly reacts with a lithium mixed metal oxide raw material during calcination and preferably is one or more inactive fluxes selected from the group consisting of a carbonate of A, a sulfate of A, a nitrate of A, a phosphate of A, a hydroxide of A, a chloride of A, a molybdate of A, and a tungstate of A (A herein represents one or more elements selected from the group consisting of Na, K, Rb, Cs, Ca, Mg, Sr, and Ba).

Examples of the carbonate of A include $Na_2CO_3$, $K_2CO_3$, $Rb_2CO_3$, $Cs_2CO_3$, $CaCO_3$, $MgCO_3$, $SrCO_3$, and $BaCO_3$.

Examples of the sulfate of A include $Na_2SO_4$, $K_2SO_4$, $Rb_2SO_4$, $Cs_2SO_4$, $CaSO_4$, $MgSO_4$, $SrSO_4$, and $BaSO_4$.

Examples of the nitrate of A include $NaNO_3$, $KNO_3$, $RbNO^3$, $CsNO_3$, $Ca(NO_3)_2$, $Mg(NO_3)_2$, $Sr(NO_3)_2$, and $Ba(NO_3)_2$.

Examples of the phosphate of A include $Na_3PO_4$, $K_3PO_4$, $Rb_3PO_4$, $Cs_3PO_4$, $Ca_3(PO_4)_2$, $Mg_3(PO_4)_2$, $Sr_3(PO_4)_2$, and $Ba_3(PO_4)_2$.

Examples of the hydroxide of A include NaOH, KOH, RbOH, CsOH, $Ca(OH)_2$, $Mg(OH)_2$, $Sr(OH)_2$, and $Ba(OH)_2$.

Examples of the chloride of A include NaCl, KCl, RbCl, CsCl, $CaCl_2$, $SrCl_2$, $BaCl_2$, and $MgCl_2$.

Examples of the molybdate of A include $Na_2MoO_4$, $K_2MoO_4$, $Rb_2MoO_4$, $Cs_2MoO_4$, $CaMoO_4$, $MgMoO_4$, $SrMoO_4$, and $BaMoO_4$.

Examples of the tungstate of A include $Na_2WO_4$, $K_2WO_4$, $Rb_2WO_4$, $Cs_2WO_4$, $CaWO_4$, $MgWO_4$, $SrWO_4$, and $BaWO_4$.

Two or more of these inactive fluxes may be used. Out of those inactive fluxes, the carbonates of A, especially $Na_2CO_3$ and $K_2CO_3$, are preferred as inactive fluxes for obtaining a particulate positive electrode active material that has increased crystalline and is less apt to have flocculation of primary particles thereof; the use of such inactive fluxes makes it possible to obtain positive electrode active materials capable of affording nonaqueous electrolyte secondary batteries having an increased discharge capacitance. Inactive fluxes other than the above-mentioned inactive fluxes may be used together according to need. Examples of the inactive flux include such inactive fluxes as KF, $NH_4F$, and $NH_4Cl$.

In Method 2, the amount of the inactive flux present at the time of calcination is usually 0.1 to 100 parts by weight per 100 parts by weight of the raw materials of the positive electrode active material. A preferred amount of the inactive flux present is 0.5 to 90 parts by weight, more preferably 1 to 80 parts by weight.

The maintaining temperature in the calcination is an important factor in adjusting the BET specific surface area of the positive electrode active material to be obtained. Usually, the higher the maintaining temperature is set, the smaller the BET specific surface area tends to become. The lower the maintaining temperature is set, the larger the BET specific surface area tends to become. The maintaining temperature in usual calcination may be within the range of 200 to 1050° C. and a preferable maintaining temperature may be within the range of 650 to 950° C. The setting of the maintaining temperature also depends on the type of the inactive flux to be used and may be determined merely taking into consideration the melting point of the inactive flux to be used and preferably is carried out at a temperature within the range of from (the melting point−100° C.) to (the melting point +100° C.). The time for which the mixture is maintained at the maintaining temperature is usually 0.1 to 20 hours, and preferably 0.5 to 8 hours. The temperature ramp-up rate to the maintaining temperature is usually 50 to 400° C./hour and the temperature ramp-down rate from the maintaining temperature to room temperature is usually 10 to 400° C./hour. While air, oxygen, nitrogen, argon, or mixed gas thereof can be used as the atmosphere for the calcination, air atmosphere is preferred. The inactive flux may remain in the positive electrode active material or alternatively may be removed by washing, evaporation, or the like.

After the calcination, the positive electrode active material may be ground using a ball mill, a jet mill, or the like, and grinding and calcination may each be repeated twice or more. The positive electrode active material may be washed or classified according to need.

The positive electrode active material to be obtained by Method 2 is preferably represented by the following formula.

From the viewpoint of increasing the cycling characteristics or discharge capacitance of a nonaqueous electrolyte secondary battery to be obtained, x is preferably not less than 0.9 and not more than 1.3. Preferably, y is more than 0 and not more than 0.1, more preferably mare than 0 and not more than 0.01.

In order to increase the discharge capacitance of a nonaqueous electrolyte secondary battery to be obtained, the $M^{11}$ is preferably one or more elements selected from the group consisting of V, Al, and Mg, and it is more preferably V.

The $M^{21}$ is preferably one or more elements selected from the group consisting of Ni, Co, and Mn.

<Positive Electrode>

A production example of a positive electrode for a nonaqueous electrolyte secondary battery is described below as a method of producing a positive electrode using the above-described positive electrode active material.

The positive electrode is produced by supporting a positive electrode mixture containing a positive electrode active material, a conductive material and a binder on a positive electrode current collector. Carbonaceous materials can be used as the conductive material. Examples of such carbonaceous materials include graphite powder, carbon black (for example, acetylene black), and fibrous carbonaceous materials. It is also permissible to use two or more of these in admixture. Since carbon black, such as acetylene black, is in the form of fine particles and is large in surface area, the conductivity of the inside of the positive electrode can be enhanced by the addition of a small amount of carbon black into the positive electrode mixture, and the charge-discharge efficiency and the rate characteristics of a nonaqueous electrolyte secondary battery can thereby be improved. However, when carbon black is added to the positive electrode mixture too much, an adhesion property by the binder between the positive electrode mixture and the positive electrode current collector is lowered, causing internal resistance to increase. In general, the proportion of the conductive material in the positive electrode mixture is 5 to 20 parts by weight per 100 parts by weight, of the positive electrode active material. In the case of using a fibrous carbonaceous material, such as graphitized carbon fiber or carbon nanotube, as the conductive material, it is possible to decrease the proportion.

The binder may be a thermoplastic resin, specific examples of which include fluororesins such as polyvinylidene fluoride (hereinafter sometimes described as PVdF), polytetrafluoroethylene (hereinafter sometimes described as PTFE), tetrafluoroethylene-hexafluoropropylene-vinylidene fluoride copolymers, hexafluoropropylene-vinylidene fluoride copolymers, and tetrafluoroethylene-perfluorovinyl ether copolymers; and polyolefin resins such as polyethylene and polypropylene. Two or more of such thermoplastic resins may be used in admixture. By the use of a fluororesin and a polyolefin resin as binders and the positive electrode mixture's inclusion of the fluororesin and the polyolefin resin so that the proportion of the fluororesin to the positive electrode mixture may become 1 to 10% by weight and the proportion of the polyolefin resin to the positive electrode mixture may become 0.1 to 2% by weight, a positive electrode mixture superior in adhesion property to a positive electrode current collector can be obtained.

While Al, Ni, stainless steel, etc. can be used as the positive electrode current collector, Al is preferred in that it can be processed into thin film and if is inexpensive. Examples of the method for supporting the positive electrode mixture onto the positive electrode current collector include a method involving compression molding; and a method comprising preparing a positive electrode mixture paste by further use of an organic solvent, etc., applying the paste onto the positive electrode current collector, drying it, and then pressing the resulting sheet, thereby fixing the positive electrode mixture to the positive electrode current collector. The positive electrode mixture paste contains a positive electrode active material, a conductive material, a binder, and an organic solvent. Example of the organic solvent include amine solvents, such as N,N-dimethylaminopropylamine and diethylenetriamine; ether solvents, such as tetrahydrofuran; ketone solvents, such as methyl ethyl ketone; ester solvents, such as methyl acetate; and amide solvents, such as dimethylacetamide and N-methyl-2-pyrrolidone (this rev hereinafter be called NMP).

Examples of the method of applying the positive electrode mixture paste to the positive electrode current collector include a slit-die coating method, a screen coating method, a curtain coating method, a knife coating method, a gravure coating method, and an electrostatic spray coating method. By the above, a positive electrode for a nonaqueous electrolyte secondary battery can be produced.

<Nonaqueous Electrolyte Secondary Battery>

A production example of a lithium secondary battery is described below as a method for producing a nonaqueous electrolyte secondary battery using the above-described positive electrode. A lithium secondary battery can be produced by a method that comprises obtaining a group of electrodes by stacking or stacking and winding a separator, a negative electrode, and the above-described positive electrode, putting the electrode group in a battery case, and pouring an electrolytic solution into the battery case.

Examples of the shape of the electrode group include shapes having a cross section such as a circular shape, an elliptical shape, a rectangular shape or a rectangular shape with round corners, when the electrode group has been cut in the direction perpendicular to the axis of winding of the electrode group. Examples of the shape of the battery include a paper shape, a coin shape, a cylinder shape, and a rectangular shape.

<Negative Electrode>

A negative electrode can be doped and dedoped with lithium ions at a lower electric potential than that of a positive electrode. Examples of the negative electrode include an electrode in which a negative electrode mixture containing a negative electrode material is supported on a negative electrode current collector and an electrode made of a negative electrode material alone. Examples of such a negative electrode material include carbonaceous materials, chalcogen compounds (e.g., oxides and sulfides), nitrides, metals, or alloys which are materials capable of being doped and dedoped with lithium ions at a lower electric potential than that of a positive electrode. Such negative electrode materials may be used in admixture.

Examples of the negative electrode material are described below. Specific examples of the above-mentioned carbonaceous materials include graphites such as naturally occurring graphites and artificial graphites, cokes, carbon black, pyrolytic carbons, carbon fibers, and calcined organic polymer compounds. Specific examples of the oxide include oxides of silicon represented by the formula $SiO_x$ (x is a positive real number), such as $SiO_2$ and SiO; oxides of titanium represented by the formula $TiO_x$ (x is a positive real number), such as $TiO_2$ and TiO; oxides of vanadium represented by the formula $VO_x$ (x is a positive real number), such as $V_2O_5$ and $VO_2$; oxides of iron represented by the formula $FeO_x$ (x is a positive real number), such as $Fe_3O_4$, $Fe_2O_3$, and FeO; oxides of tin represented by the formula $SnO_x$ (x is a positive real number), such as $SnO_2$ and SnO; oxides of tungsten represented by the general formula $WO_x$ (x is a positive real number), such as $WO_3$ and $WO_2$; and mixed metal oxides containing lithium and titanium and/or vanadium, such as $Li_4Ti_5O_{12}$ and $LiVO_2$ (including $L_{1.1}V_{0.9}O_2$). Specific examples of the sulfide include sulfides of titanium represented by the formula $TiS_x$ (x is a positive real number), such as $Ti_2S_3$, $TiS_2$, and TiS; sulfides of vanadium represented by the formula $VS_x$ (x is a positive real number), such as $V_3S_4$, $VS_2$, and VS; sulfides of iron represented by the formula $FeS_x$ (x is a positive real number), such as $Fe_3S_4$, $FeS_2$, and FeS; sulfides of the molybdenum represented by the formula $MoS_x$ (x is a positive real number), such as $Mo_2S_3$ and $MoS_2$; sulfides of tin represented by the formula $SnS_x$ (x is a positive real number), such as $SnS_2$ and SnS; sulfides of tungsten represented by the formula $WS_x$ (x is a positive real number), such as $WS_2$; sulfides of antimony represented by the formula $SbS_x$ (x is a positive real number), such as $Sb_2S_3$; and sulfides of selenium represented by the formula $SeS_x$ (x is a positive real number), such as $Se_5S_3$, $SeS_2$, and SeS. Specific examples of the nitride include lithium-containing nitrides such as $Li_3N$ and $Li_{3-x}A_xN$ wherein A is Ni and/or Co; and $0<x<3$. The carbonaceous materials, the oxides, the sulfides, and the nitrides may be used in combination of two or more types. They may be either crystalline or amorphous. The carbonaceous materials, the oxides, the sulfides, and the nitrides are generally supported on a negative electrode current collector and then used as an electrode.

Specific examples of such, metals include lithium metal, silicon metal, and tin metal. Examples of the alloys include lithium alloys such as Li—Al, Li—Ni, and Li—Si; silicon alloys such as Si—Zn; tin alloys such as Sn—Mn, Sn—Co, Sn—Ni, Sn—Cu, and Sn—La; and alloys such as $Cu_2Sb$ and $La_3Ni_2Sn_7$. These metals and alloys are generally used alone as an electrode (for example, used in a foil form).

Of the above-described negative electrode materials, a carbonaceous material containing graphite such as naturally occurring graphite or artificial graphite as a main component is preferably used from the viewpoint of high potential flatness, low average discharge potential, and good cycling characteristics. Examples of the shape of the carbonaceous material include a flaky-shape such as that of naturally occurring graphite, a spherical shape such as that of mesocarbon microbeads, a fibrous shape such as that of graphitized carbon fibers. The carbonaceous material may be an aggregate of a fine powder.

The negative electrode mixture may contain a binder as needed. Such a binder may be a thermoplastic resin and specific examples thereof include PVdF, thermoplastic polyimide, carboxymetylcellulose, polyethylene, and polypropylene.

Examples of the negative electrode current collector include Cu, Ni, and stainless steel, and Cu is preferred in that it hardly forms an alloy with lithium and it is easy to process into thin film. Examples of the method for supporting the negative electrode mixture onto the negative electrode current collector, which are similar to those in the case of the above-described positive electrode, include a method, by compression molding; and a method comprising preparing a negative electrode mixture paste by further use of an organic solvent and the like, applying the paste to the negative electrode current collector, drying it, and then pressing the resulting sheet, thereby fixing the negative electrode mixture to the negative electrode current collector.

<Separator>

As the separator, for example, there may be used a member being made of a material such as a polyolefin resin, such as polyethylene or polypropylene, a fluororesin, and a nitrogen-containing aromatic polymer and having a form of a porous membrane, a non-woven fabric, a woven fabric, or the like. The separator may be made of two or more of the aforementioned materials and the member may be a laminated separator in which the aforementioned members are laminated. Examples of such separators include the separators described in JP-A-2000-30686, JP-A-10-324758, and so on. The thickness of the separator is usually about 5 to about 200 μm, preferably about 5 to about 40 μm from the viewpoint of increase in the volume energy density of a battery and decrease in the internal resistance thereof. Preferably, the separator is as thin as possible as long as mechanical strength is secured.

The separator preferably has a porous film containing a thermoplastic resin. In a nonaqueous electrolyte secondary battery, the separator is placed between the positive electrode and the negative electrode. The separator preferably has a function (shutdown function) by which, when art abnormal current flows in the battery usually because of, for example, short circuit between a positive electrode and a negative electrode, the current is interrupted to block the flow of excessive current. Herein, the shutdown is achieved by closing micropores of the porous film in the separator in the case of exceeding usual working temperature. It is preferable that, after the shutdown, even if the temperature in the battery increases to a certain high temperature, membrane destruction should not occur at the temperature and a shutdown state be maintained. Examples of such a separator include a laminated film having a heat-resistant porous layer and a porous film laminated to each other. The heat resistance of a secondary battery can be further enhanced by using such a film as a separator. Herein, the heat-resistant porous layer may be laminated on both surfaces of the porous film.

<Laminated Film>

A laminated film which has the heat-resistant porous layer and the porous film laminated to each other is described below.

In the laminated film, the heat-resistant porous layer is a layer higher in heat resistance than the porous film, and the heat-resistant porous layer may be formed from an inorganic powder and may contain a heat-resistant resin. When the heat-resistant porous layer contains a heat-resistant resin, the heat-resistant porous layer can be formed by an easy method such as coating. Examples of the heat-resistant resin include polyamide, polyimide, polyamideimide, polycarbonate, polyacetal, polysulfone, polyphenylene sulfide, polyetherketone, aromatic polyester, polyethersulfone, and polyetherimide, and from the viewpoint of further enhancing heat resistance, polyamide, polyimide, polyamideimide, polyethersulfone, and polyetherimide are preferred, and polyamide, polyimide, and polyamide are more preferred. Still more preferred are nitrogen-containing aromatic polymers such as aromatic polyamides (para-oriented aromatic polyamide, meta-oriented aromatic polyamide), aromatic polyimides, and aromatic polyamideimides, especially preferred are aromatic polyamides, and, in terms of production, particularly preferred is para-oriented aromatic polyamide (hereinafter sometimes described as para-aramid). Additional examples of the heat-resistant resins include poly-4-methylpentene-1 and cyclic olefin polymers. By using such heat-resistant resins, the heat resistance of a laminated film, namely, the thermal film destruction temperature of the laminated film can be further increased. When a nitrogen-containing aromatic polymer selected from among these heat-resistant resins is used, compatibility with an electrolytic solution may be good due to its intramolecular polarity, and, in this case, the liquid retaining property of an electrolytic solution in the heat-resistant porous layer is improved. Thereby, the rate of injection of an electrolytic solution is increased in the production of a nonaqueous electrolyte secondary battery, and the discharge capacitance of the nonaqueous electrolyte secondary battery is further increased.

The thermal film destruction temperature of the laminated film depends on the kind of a heat-resistant resin and is selected and used according to a use situation and a use purpose. More specifically, the thermal film destruction temperature may be controlled to about 400° C. in the case of using the above-mentioned nitrogen-containing aromatic polymer as a heat-resistant resin, to about 250° C. in the case of using poly-4-methylpentene-1, and to about 300° C. in the case of using a cyclic olefin polymer. When the heat-resistant porous layer is formed from an inorganic powder, the thermal film destruction temperature may be controlled to, for example, 500° C. or more.

The para-aramid is obtained by condensation polymerization of a para-oriented aromatic diamine and a para-oriented aromatic dicarboxylic halide and consists essentially of repeating units in which an amide bond is bound at a para-position or according orientation position of an aromatic ring (for example, 4,4' position in biphenylene, 1,5 position in naphthalene, or 2,6 position in naphthalene). Specific examples of the para-aramides include para-aramides having a structure of para-orientation or orientation corresponding to para-orientation, such as poly(paraphenyleneterephthalamide), poly(parabenzamide), poly(4,4'-benzanilideterephthalamide), poly(paraphenylene-4,4'-biphenylenedicarboxylic amide), poly(paraphenylene-2,6-naphthalenedicarboxylic amide), poly(2-chloro-paraphenyleneterephthalamide), and paraphenyleneterephthalamide/2,6-dichloroparaphenyleneterephthalamide copolymer.

Preferred as the aromatic polyimide is a wholly aromatic polyimide produced by condensation polymerization of an aromatic acid dianhydride with a diamine. Specific examples of the acid dianhydride include pyromellitic dianhydride, 3,3',4,4'-diphenylsulfonetetracarboxylic dianhydride, 3,3', 4,4'-benzophenonetetracarboxylic dianhydride, 2,2'-bis(3,4-dicarboxyphenyl)hexafluoropropane, and 3,3',4,4'-biphenyltetracarboxylic dianhydride. Specific examples of the diamine include oxydianiline, paraphenylenediamine, benzophenonediamine, 3,3'-methylenedianiline, 3,3'-diaminobenzophenone, 3,3'-diaminodiphenylsulfone, and 1,5-naphthalenediamine. A polyimide soluble in a solvent can preferably be used. One example of such polyimides is a polyimide which is a polycondensate of 3,3',4,4'-diphenylsulfonetetracarboxylic dianhydride with an aromatic diamine.

Examples of the aromatic polyamideimide include a condensation polymerization product between an aromatic dicarboxylic acid and an aromatic diisocyanate, and a condensation polymerization product between an aromatic dianhydride and an aromatic diisocyanate. Specific examples of the aromatic dicarboxylic acid include isophthalic acid and terephthalic acid. Specific examples of the aromatic dianhydride include trimellitic anhydride. Specific examples of the aromatic diisocyanate include 4,4'-diphenylmethane diisocyanate, 2,4-tolylene diisocyanate, 2,6-tolylene diisocyanate, orthotolylene diisocyanate, and m-xylene diisocyanate.

In order to improve ionic permeability, the heat-resistant porous layer is preferred to be thinner and specifically, it is preferably 1 to 10 μm, more preferably 1 to 5 μm, and particularly preferably 1 to 4 μm. The heat-resistant porous layer has micropores, the size (diameter) of which is usually not more than 3 μm, preferably not more than 1 μm. When the heat-resistant porous layer contains a heat-resistant resin, the heat-resistant porous layer may further contain a filler as described below.

In the laminated film, the porous film has micropores. The porous film preferably has a shutdown function. In this case, the porous film contains a thermoplastic resin. The porous film has a micropore size (diameter) of usually not more than 3 μm, preferably not more than 1 μm. The porous film usually has a porosity of 30 to 80% by volume, preferably 40 to 70% by volume. When the nonaqueous electrolyte secondary battery exceeds a usual working temperature, the porous film containing a thermoplastic resin is capable of closing micropores by softening of the thermoplastic resin forming the film.

As the thermoplastic resin, one that is not dissolved in the electrolytic solution in the nonaqueous electrolyte secondary battery may be selected. Specific examples of such a thermoplastic resin include polyolefin resins, such as polyethylene and polypropylene, and thermoplastic polyurethane resins, and a mixture of two or more thermoplastic resins may also be used. Preferably, the porous film contains polyethylene in order to soften at lower temperature to attain shutdown. Specific examples of the polyethylene include polyethylenes such as low density polyethylene, high density polyethylene, and linear polyethylene, and ultrahigh-molecular weight polyethylene having a molecular weight of not less than 1,000,000 can also be mentioned as an example. Preferably, the porous film contains an ultrahigh-molecular weight polyethylene in order to further increase the puncture strength. In order to produce a porous film easily, the thermoplastic resin preferably contain a wax comprising a polyolefin having a low molecular weight (weight average molecular weight of not more than 10,000) in some cases.

The thickness of a porous film in a laminated film is usually 3 to 30 μm, preferably 3 to 25 μm, and more preferably 3 to 19 μm. The thickness of the laminated film is usually 40 μm or less, preferably 30 μm or less. When the thickness of the heat-resistant porous layer is expressed by A (μm) and the thickness of the porous film is expressed by B (μm), the value of A/B is preferably not less than 0.1 and not more than 1.

When a heat-resistant porous layer contains a heat-resistant resin, the heat-resistant porous layer may contain one or more fillers. The material of such filler may be selected from any of organic powders, inorganic powders, and mixtures thereof. Particles constituting the filler preferably have an average particle diameter of not less than 0.01 to 1 μm.

Examples of the organic powders include powders of organic substances such as homopolymers or copolymers of two or more species selected from among styrene, vinyl ketone, acrylonitrile, methyl methacrylate, ethyl methacrylate, glycidyl methacrylate, glycidyl acrylate, methyl acrylate, and so on; fluorinated resins such as polytetrafluoroethylene, tetrafluoroethylene-hexafluoropropylene copolymers, tetrafluoroethylene-ethylene copolymers, and PVdF; melamine resins; urea resins; polyolefins; and polymethacrylates. These organic powders may be used singly or two or more of them may be used in admixture. Among these organic powders, a polytetrafluoroethylene powder is preferable in terms of chemical stability.

Examples of the inorganic powder include powders of inorganic substances such as metal oxides, metal nitrides, metal carbides, metal hydroxides, carbonates, and sulfates. Out of these, a powder of an inorganic matter low in conductivity is preferably used. Specific examples of preferable inorganic powders include a powder of alumina, silica, titanium dioxide, calcium carbonate, or the like. These inorganic powders may be used singly or two or more of them may be used in admixture. Among these inorganic powders, an alumina powder is preferable in terms of chemical stability. It is more preferable that all particles composing the filler be alumina particles, and it is further preferable that all particles composing the filler be alumina particles and some or all of them be approximately spherical alumina particles. When the heat-resistant porous layer is formed from inorganic powder, any of the inorganic powders provided above as examples may be used and, as needed, may be used in admixture with a binder.

When the heat-resistant, porous layer contains a heat-resistant resin, the content of a filler depends on the specific gravity of the material of the filler. For example, when all particles constituting the filler are alumina particles, the proportion of the weight of the filler is usually 5 to 95, preferably 20 to 95, and more preferably 30 to 90 per 100 of the overall weight of the heat-resistant porous layer. These ranges may appropriately be set depending on the specific gravity of the material of the filler.

While examples of the shape of the filler include such shapes as an approximately spherical shape, a platy shape, a pillar-like shape, a needle-like shape, a whisker-like shape, and a fibrous shape, the filler is preferably in an approximately spherical shape because uniform pores are easily formed. Examples of approximately spherical particles include particles having an aspect ratio (longer diameter of particle/shorter diameter of particle) of not less than 1 and not more than 1.5. The aspect ratio of a particle can be measured from an electron micrograph.

In terms of ion permeability in a secondary battery, a separator preferably has an air permeability, determined by the Gurley method, of from 50 to 300 sec/100 cc, more preferably 50 to 200 sec/100 cc. The porosity of the separator is usually 30 to 80% by volume, preferably 40 to 70% by volume. The separator may be a laminated separator in which separators differing in porosity have been laminated to each other.

<Electrolytic Solution or Solid Electrolyte>

In a secondary battery, an electrolytic solution usually contains an electrolyte and an organic solvent. Examples of the electrolyte include lithium salts such as $LiClO_4$, $LiPF_6$, $LiAsF_6$, $LiSbF_6$, $LiBF_4$, $LiCF_3SO_3$, $LiN(SO_2CF_3)_2$, $LiN(SO_2C_2F_5)_2$, $LiN(SO_2CF_3)(COCF_3)$, $Li(C_4F_9SO_3)$, $LiC(SO_2CF_3)_3$, $Li_2B_{10}Cl_{10}$, LiBOB wherein BOB represents bis(oxalato)borate, lithium salts of lower aliphatic carboxylic acids, and $LiAlCl_4$; two or more electrolytes may be used in admixture. Among these, at least one fluorine-containing lithium salt selected from the group consisting of $LiPF_6$, $LiAsF_6$, $LiSbF_6$, $LiBF_4$, $LiCF_3SO_3$, $LiN(SO_2CF_3)_2$, and $LiC(SO_2CF_3)_3$ is usually used.

In the electrolytic solution, there can be used as the organic solvent carbonates such as propylene carbonate, ethylene carbonate (hereafter sometimes described as EC), dimethyl carbonate (hereafter sometimes described as DMC), diethyl carbonate, ethylmethyl carbonate (hereafter sometimes described as EMC), 4-trifluoromethyl 1,3-dioxolan-2-one, and 1,2-di(methoxycarbonyloxy)ethane; ethers such as 1,2-dimethoxyethane, 1,3-dimethoxypropane, pentafluoropropyl methyl ether, 2,2,3,3-tetrafluoropropyl difluoromethyl ether, tetrahydrofuran, and 2-methyltetrahydrofuran; esters such as methyl formate, methyl acetate, and γ-butyrolactone; nitrites such as acetonitrile and butyronitrile; amides such as N,N-dimethylformamide and N,N-dimethylacetamide; carbamates such as 3-methyl-2-oxazolidone; sulfur-containing compounds such as sulfolane, dimethyl sulfoxide, and 1,3-propanesultone, or ones resulting from the introduction of fluorine substituents to the above-listed organic solvents. Usually, a mixed solvent in which two or more organic solvents selected from among those listed above have been mixed is used. Particularly, mixed solvents containing carbonates are preferred, and mixed solvents of cyclic carbonates with acyclic carbonates or mixed solvents of cyclic carbonates and ethers are more preferred. A mixed solvent containing EC, DMC and EMC is preferred as a mixed solvent of a cyclic carbonate and an acyclic carbonate in that this works in a wide range of temperature and is superior in load characteristics and is persistent even if a graphite material such as naturally occurring graphite or artificial graphite is used as an active material of a negative electrode. It is preferred to use an electrolytic solution containing a fluorine-containing lithium salt such as $LiPF_6$ and an organic solvent having a fluorine substituent. A mixed solvent containing DMC and an ether having a fluorine substituent such as pentafluoropropyl methyl ether and 2,2,3,3-tetrafluoropropyl difluoromethyl ether is more preferred because it is superior also in high current discharge properties.

A solid electrolyte may be used instead of the above-described electrolytic solution. As the solid electrolyte, for example, an organic polyelectrolyte such as polyethylene oxide-based polymer and polymers having at least one of a polyorganosiloxane chain and a polyoxyalkylene chain can be used. A so-called gel-type electrolyte prepared by causing a polymer to support an electrolytic solution may also be used. An inorganic solid electrolyte containing a sulfide such as $Li_2S$—$SiS_2$, $Li_2S$—$GeS_2$, $Li_2S$—$P_2S_5$, $Li_2S$—$B_2S_3$, $Li_2S$—$SiS_2$—$Li_3PO_4$, and $Li_2S$—$SiS_2$—$Li_2SO_4$ may also be used. In the event that a solid electrolyte is used in a nonaqueous electrolyte secondary battery, the solid electrolyte may serve as a separator and no separator may be needed in such a case.

EXAMPLES

The present invention is described in more detail below by Examples. Evaluation of the positive electrode active material, the charging/discharging test, and the cycle test were carried out by the following methods.

1) Charging/Discharging Test

A positive electrode mixture paste was obtained by adding a solution, in which a binder PVdF had been, dissolved in NMP to a mixture of a positive electrode active material and a conductive material (a material in which acetylene black and graphite had been mixed in 9:1) so that a composition of active material:conductive material:binder=87:10:3 (weight ratio) would be produced, followed by kneading. The paste was applied to a 40 μm thick Al foil, which was a current collector, and then vacuum dried at 150° C. for 8 hours, so that a positive electrode was obtained.

1-1) 25° C. Test

A coin type cell (R2032) was produced by pouring an electrolytic solution into the positive electrode obtained and combining a polypropylene porous membrane as a separator and a metal lithium as a negative electrode with the positive electrode. A solution (the concentration of $LiPF_6$ was 1 mol/liter) prepared by dissolving $LiPF_6$ in a mixed solvent of EC:DMC:EMC=30:35:35 (volume ratio) was used as an electrolytic solution.

Using the coin type cell, a cycle test was carried out under the conditions given below under maintenance at 25° C. The cycling characteristics were evaluated on the basis of a discharge capacitance maintenance factor defined below.

<25° C. Cycle Test>

A test was performed 50 cycles at a maximum charge voltage of 4.3 V and a minimum discharge voltage of 2.5 V at 0.2 C rate for the first, tenth, twentieth, and fiftieth cycles and at 1 C rate for the other cycles.

<25° C. Discharge Capacitance Maintenance Factor>

Discharge capacitance maintenance factor (25° C.) (%)=(discharge capacitance in the fiftieth cycle at 25° C. conditions)/(discharge capacitance in the first cycle at 25° C.)×100

1-2) 60° C. Test

A coin type cell (R2032) was produced in the same manner as 1-1) described above. A solution (the concentration of $LiPF_6$ was 1 mol/liter) prepared by dissolving $LiPF_6$ in a mixed solvent of EC:EMC=50:50 (volume ratio) was used as an electrolytic solution.

Using the coin type cell, a cycle test was carried out under the conditions given below under maintenance at 60° C. The cycling characteristics were evaluated on the basis of a discharge capacitance maintenance factor defined below.

<60° C. Cycle Test>

A test was performed at a maximum charge voltage of 4.3 V and a minimum discharge voltage of 3.0 V at 0.2 C rate.

<60° C. Discharge Capacitance Maintenance Factor>

Discharge capacitance maintenance factor (60° C.) (%)=(discharge capacitance in the fiftieth cycle at 60° C. conditions)/(discharge capacitance in the first cycle at 60° C.)×100

2) Oppositional Analysis of Positive Electrode Active Material

Compositional analysis of a positive electrode active material was performed using inductively coupled plasma spectroscopy (SPS3000 manufactured by SII Nanotechnology Inc.; this may hereinafter be called ICP-AES) after dissolving a powder of the material in hydrochloric acid.

3) Powder X-Ray Diffraction Analysis Measurement of Positive Electrode Active Material The powder X-ray diffraction analysis measurement of a positive electrode active material was performed using RINT2500TTR manufactured by Rigaku International Corporation. The measurement was performed using a CuKα ray source within a diffraction angle 2θ range of 10 to 90° with the positive electrode active material filled in a specially designed holder, so that a powder X-ray diffraction pattern was obtained.

4) BET Specific Surface Area Measurement

About 0.2 g of powder was dried in a nitrogen atmosphere at 150° C. for 15 minutes, and then a BET specific surface area was measured using FlowSorb II2300 manufactured by Micromeritics Instrument Corporation.

Example 1-1

An aqueous solution was obtained by dissolving 3.62 g of lithium nitrate, 7.12 g of nickel (II) nitrate hexahydrate, 7.18 g of manganese (II) nitrate hexahydrate, and 0.217 g of vanadyl sulfate n-hydrate, (n=2 to 4) completely in 50 ml of distilled water in a beaker trade of polypropylene.

Subsequently, spray drying of the resulting aqueous solution was performed at 90° C. under air atmosphere using a spray dryer ADL310 manufactured by Yamato Scientific Co., Ltd.

The spray-dried material obtained was heat-treated at 100° C., and subsequently it was put into a calcination vessel made of alumina and then subjected to heat treatment by being held in air atmosphere at 800° C. for 6 hours using an electric furnace. Subsequently, this was washed to afford a positive electrode active material $S^{11}$. The BET specific surface area of the positive electrode active material $S^{11}$ was 13.7 m²/g.

The compositional analysis of the positive electrode active material $S^{11}$ revealed that the molar ratio of Li:Ni:Mn:V was 1.03:0.48:0.51:0.01. The powder X-ray diffraction analysis measurement revealed that the crystal structure of the positive electrode active material $S^{11}$ was a layered structure assigned to an R-3m space group. Therefore, it was shown that the positive electrode active material $S^{11}$ was represented by formula (I).

A coin type cell was produced using the positive electrode active material $S^{11}$ and was subjected to a 60° C. cycle test, so that the discharge capacitance maintenance factor (60° C.) (%) was found to be 90.6. This was higher than the discharge capacitance maintenance factor (60° C.) obtained in the case that a coin type cell was produced using $R^1$ in Comparative Example 1 described below.

A coin type cell was produced using the positive electrode active material $S^{11}$ and was subjected to a 25° C. cycle test, so that the discharge capacitance maintenance factor (25° C.) (%) was found to be 92.7. This was higher than the discharge capacitance maintenance factor (25° C.) obtained in the case that a coin type cell was produced using $R^1$ in Comparative Example 1 described below.

Example 1-2

An aqueous solution $W^1$ was obtained by dissolving 1.50 g of lithium carbonate and 15.1 g of citric acid completely in 37 ml of distilled water in a beaker made of polypropylene. Moreover, an aqueous solution $W^2$ was obtained by dissolving 5.48 g of nickel (II) nitrate hexahydrate, 5.52 g of manganese (II) nitrate hexahydrate, and 0.04 g of vanadyl sulfate n-hydrate (n=2 to 4) completely in 37 ml of distilled water in a beaker made of polypropylene, and then $W^1$ and $W^2$ were mixed.

Subsequently, spray drying of the resulting aqueous solution was performed at 95° C. under air atmosphere using a spray dryer ADL310 manufactured by Yamato Scientific Co., Ltd.

The spray-dried material obtained was put into a calcination vessel made of alumina and then subjected to heat treatment by being held in air atmosphere at 900° C. for 6 hours using an electric furnace, affording a positive electrode active material $S^{12}$. The BET specific surface area of the positive electrode active material $S^{12}$ was 8.7 m²/g.

The compositional analysis of the positive electrode active material $S^{12}$ revealed that the molar ratio of Li:Ni:Mn:V was 1.05:0.50:0.50:0.006. The powder X-ray diffraction analysis measurement revealed that the crystal structure of the positive electrode active material $S^{12}$ was a layered structure assigned to an R-3m space group. Therefore, it was shown that the positive electrode active material $S^{12}$ was represented by formula (I).

A coin type cell was produced using the positive electrode active material $S^{12}$ and was subjected to a 25° C. cycle test, so that the discharge capacitance maintenance factor (25° C.) (%) was found to be 94.6. This was higher than the discharge capacitance maintenance factor (25° C.) obtained in the case that a coin type cell was produced using $R^1$ in Comparative Example 1 described below.

Example 1-3

The positive electrode active material $S^{12}$ obtained in Example 1-2 was washed with water and then dried at 100° C., affording a positive electrode active material $S^{13}$. The BET specific surface area of the positive electrode active material $S^{13}$ was 9.3 m²/g.

The compositional analysis of the positive electrode active material $S^{13}$ revealed that the molar ratio of Li:Ni:Mn:V was 1.02:0.50:0.50:0.002. The powder X-ray diffraction analysis measurement revealed that the crystal structure of the positive electrode active material $S^{13}$ was a layered structure assigned to an R-3m space group. Therefore, it was shown that the positive electrode active material $S^{13}$ was represented by formula (I).

A coin type cell was produced using the positive electrode active material $S^{13}$ and was subjected to a 25° C. cycle test, so that the discharge capacitance maintenance factor (25° C.) (%) was found to be 93.8. This was higher than the discharge capacitance maintenance factor (25° C.) obtained in the case that a coin type cell was produced using $R^1$ in Comparative Example 1 described below.

Example 1-4

An aqueous solution $W^3$ was obtained by dissolving 1.50 g of lithium carbonate and 15.1 g of citric acid completely in 37 ml of distilled water in a beaker made of polypropylene. Moreover, an aqueous solution $W^4$ was obtained by dissolving 5.49 g of nickel (II) nitrate hexahydrate, 5.53 g of manganese (II) nitrate hexahydrate, and 0.025 g of vanadyl sulfate n-hydrate (n=2 to 4) completely in 37 ml of distilled water in a beaker made of polypropylene, and then $W^3$ and $W^4$ were mixed. A positive electrode active material $S^{14}$ was obtained in the same manner as Example 1-2 except the above. The BET specific surface area of the positive electrode active material $S^{14}$ was 5.6 m²/g.

The compositional analysis of the positive electrode active material $S^{14}$ revealed that the molar ratio of Li:Ni:Mn:V was 1.07:0.50:0.50:0.004. The powder X-ray diffraction analysis measurement revealed that the crystal structure of the positive electrode active material $S^{14}$ was a layered structure assigned to an R-3m space group. Therefore, it was shown that the positive electrode active material $S^{14}$ was represented by formula (I).

A coin type cell was produced using the positive electrode active material $S^{14}$ and was subjected to a 25° C. cycle test, so that the discharge capacitance maintenance factor (25° C.) (%) was found to be 92.3. This was higher than the discharge capacitance maintenance factor (25° C.) obtained in the case that a coin type cell was produced using $R^1$ in Comparative Example 1 described below.

Example 1-5

An aqueous solution $W^5$ was obtained by dissolving 1.50 g of lithium carbonate and 15.1 g of citric acid completely in 37 ml of distilled water in a beaker made of polypropylene.

Moreover, an aqueous solution $W^4$ was obtained by dissolving 5.34 g of nickel (II) nitrate hexahydrate, 5.38 g of manganese (II) nitrate hexahydrate, and 0.245 g of vanadyl sulfate n-hydrate (n=2 to 4) completely in 37 ml of distilled water in a beaker made of polypropylene, and then $W^5$ and $W^6$ were nixed. A positive electrode active material $S^{15}$ was obtained in the same manner as Example 1-2 except the above. The BET specific surface area of the positive electrode active material $S^{15}$ was 5.2 m²/g.

The compositional analysis of the positive electrode active material $S^{15}$ revealed that the molar ratio of Li:Ni:Mn:V was 1.00:0.48:0.49:0.03. The powder X-ray diffraction analysis measurement revealed that the crystal structure of the positive electrode active material $S^{15}$ was a layered structure assigned to an R-3m space group. Therefore, it was shown that the positive electrode active material $S^{15}$ was represented by formula (I).

A coin type cell was produced using the positive electrode active material $S^{15}$ and was subjected to a 25° C. cycle test, so that the discharge capacitance maintenance factor (25° C.) (%) was found to be 87.3. This was higher than the discharge capacitance maintenance factor (25° C.) obtained in the case that a coin type cell was produced using $R^1$ in Comparative Example 1 described below.

Example 1-6

An aqueous solution $W^7$ was obtained by dissolving 1.50 g of lithium carbonate and 15.1 g of citric acid completely in 37 ml of distilled water in a beaker made of polypropylene. Moreover, an aqueous solution $W^8$ was obtained by dissolving 5.56 g of nickel (II) nitrate hexahydrate and 5.49 g of manganese (II) nitrate hexahydrate completely in 37 ml of distilled water in a beaker made of polypropylene.

A mixture was obtained by adding 1 kg of tungsten oxide particles (produced by Nippon Inorganic Colour & Chemical Co., Ltd.) to 4 kg of ion exchange water as a dispersion medium, and then mixing them. The mixture was subjected to dispersive treatment using a wet medium agitation mill, affording a tungsten oxide particle dispersion liquid $W^{10}$. The content of the solid (the amount of tungsten oxide particles) contained in 100 parts by mass of $W^{10}$ was 20.0 parts by mass (the solid concentration was 20.0% by mass). $W^{10}$ was heated under a subcritical condition of 350° C. (20 MPa) for 30 seconds. The temperature of the dispersion liquid at this time was 340° C. After the heating, the dispersion liquid was cooled, at 20° C., so that the temperature of the dispersion liquid was rendered room temperature and a tungsten oxide particle dispersion liquid $W^9$ was obtained. $W^9$ was in a sol form.

$W^7$, $W^8$, and 0.669 g of $W^9$ was mixed together. A positive electrode active material $S^{16}$ was obtained in the sane manner as Example 1-2 except the above. The BET specific surface area of the positive electrode active material $S^{16}$ was 11.7 m²/g.

The compositional analysis of the positive electrode active material $S^{16}$ revealed that the molar ratio of Li:Ni:Mn:W was 1.03:0.51:0.48:0.006. The powder X-ray diffraction analysis measurement revealed that the crystal structure of the positive electrode active material $S^{16}$ was a layered structure assigned to an R-3m space group. Therefore, it was shown that the positive electrode active material $S^{16}$ was represented by formula (I).

A coin type cell was produced using the positive electrode active material $S^{16}$ and was subjected to a 25° C. cycle test, so that the discharge capacitance maintenance factor (25° C.) (%) was found to be 89.8. This was higher than the discharge capacitance maintenance factor (25° C.) obtained in the case that a coin type cell was produced using $R^1$ in Comparative Example 1 described below.

Example 2-1

In a beaker made of polypropylene, 40.4 g of potassium hydroxide was added to 600 ml of distilled water and dissolved by stirring. The potassium hydroxide was dissolved completely, so that an aqueous potassium hydroxide solution (aqueous alkali solution) was prepared. Further, in a beaker made of glass, 14.3 g of nickel (II) chloride hexahydrate, 12.1 g of manganese (II) chloride tetrahydrate, and 0.814 g of vanadyl sulfate trihydrate were dissolved in 250 ml of distilled water by addition and stirring, so that a nickel-manganese-vanadium mixed aqueous solution was obtained. While the above-mentioned aqueous potassium hydroxide solution was stirred, the above-mentioned nickel-manganese-vanadium mixed aqueous solution was dropped thereto, so that a coprecipitate was formed and a coprecipitate slurry was obtained.

Subsequently, filtration and distilled water washing were applied to the coprecipitate slurry, followed by drying at 100° C., so that a coprecipitate was obtained. 4.00 g of the coprecipitate, 2.01 g of lithium carbonate, and 0.308 g of potassium carbonate were dry mixed by using an agate mortar, affording a mixture. Subsequently, the mixture was put into a calcination container made of alumina, kept at 800° C. for 6 hours in the atmosphere by using an electric furnace to calcine the mixture, and cooled to room temperature, so that a calcined product was obtained. The resultant was pulverized, washed with distilled water by decantation, filtered, and then dried at 100° C. for 8 hours, so that a powdery positive electrode active material $S^{21}$ was obtained. The BET specific surface area of the positive electrode active material $S^{21}$ was 7.0 m²/g.

The compositional analysis of the $S^{21}$ revealed that the molar ratio of Li:Ni:Mn:V was 1.13:0.48:0.51:0.01. The powder X-ray diffraction analysis measurement revealed that the crystal structure of the above-mentioned $S^{21}$ was a layered structure assigned to an R-3m space group. Therefore, it was shown that the positive electrode active material $S^{21}$ was represented by formula (I).

A coin type cell was produced using the $S^{21}$ and was subjected to a 60° C. cycle test, so that the initial discharge capacitance (mAh/g) was found to be 163 and the discharge capacitance maintenance factor (%) was found to be 92.3. These were higher than the discharge capacitance and the discharge capacitance maintenance factor in the case that a coin type cell was produced using $R^1$ in Comparative Example 1 described below and a 60° C. cycle test was performed.

A coin type cell was produced using the $S^{21}$ and was subjected to a 25° C. cycle test, so that the initial discharge capacitance (mAh/g) was found to be 145 and the discharge capacitance maintenance factor (25° C.) (%) was found to be 92.5. These were higher than the discharge capacitance and the discharge capacitance maintenance factor in the case that a coin type cell was produced using $R^1$ in Comparative Example 1 described below and a 25° C. cycle test was performed.

Example 2-2

A powdery positive electrode active material $S^{22}$ was obtained in the same manner as Example 1 except for performing calcination at 900° C. for 8 hours. The BET specific surface area of the positive electrode active material $S^{22}$ was 6.8 m²/g.

The compositional analysis of the $S^{22}$ revealed that the molar ratio of Li:Ni:Mn:V was 1.14:0.49:0.50:0.01. The powder X-ray diffraction analysis measurement revealed that the crystal structure of the above-mentioned $S^{22}$ was a layered structure assigned to an R-3m space group. Therefore, it was shown that the positive electrode active material $S^{22}$ was represented by formula (I).

A coin type cell was produced using the S$^{22}$ and was subjected to a 60° C. cycle test, so that the initial discharge capacitance (mAh/g) was found, to be 165 and the discharge capacitance maintenance factor (60° C.) (%) was found to be 92.0. These were higher than the discharge capacitance and the discharge capacitance maintenance factor in the case that a coin type cell was produced using R$^1$ in Comparative Example 1 described below and a 60° C. cycle test was performed.

A coin type cell was produced using the S$^{22}$ and was subjected to a 25° C. cycle test, so that the initial discharge capacitance (mAh/g) was found to be 148 and the discharge capacitance maintenance factor (25° C.) (%) was found to be 92.7. These were higher than the discharge capacitance and the discharge capacitance maintenance factor in the case that a coin type cell was produced using R$^1$ in Comparative Example 1 described below and a 25° C. cycle test was performed.

Example 2-3

In a beaker made of polypropylene, 59.4 g of potassium hydroxide was added to 300 ml of distilled water and dissolved by stirring. The potassium hydroxide was dissolved completely, so that an aqueous potassium hydroxide solution (aqueous alkali solution) was prepared. Further, in a beaker made of glass, 39.2 g of nickel (II) sulfate hexahydrate, 25.2 g of manganese (II) sulfate monohydrate, and 0.353 g of vanadyl sulfate tetrahydrate were dissolved in 300 ml of distilled water by addition and stirring, so that a nickel-manganese-vanadium mixed aqueous solution was obtained. While the above-mentioned aqueous potassium hydroxide solution was stirred, the above-mentioned nickel-manganese-vanadium mixed aqueous solution was dropped thereto, so that a coprecipitate was formed and a coprecipitate slurry was obtained.

Subsequently, filtration and distilled water washing were applied to the coprecipitate slurry, followed by drying at 100° C., so that a coprecipitate was obtained. 5.00 g of the coprecipitate, 2.64 g of lithium carbonate, and 0.480 g of potassium sulfate were dry mixed by using an agate mortar, affording a mixture. Subsequently, the mixture was put into a calcination container made of alumina, kept at 850° C. for 6 hours in the atmosphere by using an electric furnace to calcine the mixture, and cooled to room temperature, so that a calcined product was obtained. The resultant was pulverized, washed with distilled water by decantation, filtered, and then dried at 100° C. for 8 hours, so that a powdery positive electrode active material S$^{23}$ was obtained.

The compositional analysis of the S$^{23}$ revealed that the molar ratio of Li:Ni:Mn:V was 1.09:0.50:0.50:0.001. The powder X-ray diffraction analysis measurement revealed that the crystal structure of the above-mentioned. S$^{23}$ was a layered structure assigned to an R-3m space group. Therefore, it was shown that the positive electrode active material S$^{23}$ was represented by formula (I).

A coin type cell was produced using the S$^{23}$ and was subjected to a 25° C. cycle test, so that the initial discharge capacitance (mAh/g) was found to be 148 and the discharge capacitance maintenance factor (%) was found to be 97.8. These were higher than the discharge capacitance and the discharge capacitance maintenance factor in the case that a coin type cell was produced using R$^1$ in Comparative Example 1 described below.

Comparative Example 1

In a beaker made of polypropylene, 40.4 g of potassium hydroxide was added to 600 ml of distilled water and dissolved by stirring. The potassium hydroxide was dissolved completely, so that an aqueous potassium hydroxide solution (aqueous alkali solution) was prepared. Further, in a beaker made of glass, 14.3 g of nickel (II) chloride hexahydrate, 12.1 g of manganese (II) chloride tetrahydrate, and 0.814 g of vanadyl sulfate trihydrate were dissolved in 250 ml of distilled water by addition and stirring, so that a nickel-manganese-vanadium mixed aqueous solution was obtained. While the above-mentioned aqueous potassium hydroxide solution was stirred, the above-mentioned nickel-manganese-vanadium mixed aqueous solution was dropped thereto, so that a coprecipitate was formed and a coprecipitate slurry was obtained.

Subsequently, filtration and distilled water washing were applied to the coprecipitate slurry, followed by drying at 100° C., so that a coprecipitate was obtained. 4.00 g of the coprecipitate and 2.01 g of lithium carbonate were dry mixed by using an agate mortar, affording a mixture. Subsequently, the mixture was put into a calcination container made of alumina, kept at 800° C. for 6 hours in the atmosphere by using an electric furnace to calcine the mixture, and cooled to room temperature, so that a calcined product was obtained. This was ground, affording a powdery positive electrode active material R$^1$. The BET specific surface area of the positive electrode active material R$^1$ was 4.8 m$^2$/g.

The compositional analysis of the R$^1$ revealed that the molar ratio of Li:Ni:Mn:V was 1.0:0.48:0.49:0.03. As a result of the powder X-ray diffraction analysis measurement, the crystal structure of the R$^1$ was observed to include impurities an Li-lacking type layered oxide and Li$_3$VO$_4$ in addition to a layered oxide assigned to an R-3m space group.

A coin type cell was produced using the R$^1$ and was subjected to a 60° C. cycle test, so that the initial discharge capacitance (60° C.) (mAh/g) was found to be 126 and the discharge capacitance maintenance factor (60° C.) (%) was found, to be 83.6.

A coin type cell was produced using the R$^1$ and was subjected to a 25° C. cycle test, so that the initial discharge capacitance (25° C.) (mAh/g) was found to be 107 and the discharge capacitance maintenance factor (25° C.) (%) was found to be 76.6.

Comparative Example 2

In a beaker made of polypropylene, 59.4 g of potassium hydroxide was added to 300 ml of distilled water and dissolved by stirring. The potassium hydroxide was dissolved completely, so that an aqueous potassium hydroxide solution (aqueous alkali solution) was prepared. Further, in a beaker made of glass, 39.4 g of nickel (II) sulfate hexahydrate and 25.4 g of manganese (II) sulfate monohydrate were dissolved in 300 ml of distilled water by addition and stirring, so that a nickel-manganese mixed aqueous solution was obtained. While the above-mentioned aqueous potassium hydroxide solution was stirred, the above-mentioned nickel-manganese mixed aqueous solution was dropped thereto, so that a coprecipitate was formed and a coprecipitate slurry was obtained.

Subsequently, filtration and distilled water washing were applied to the coprecipitate slurry, followed by drying at 100° C., so that a coprecipitate was obtained. 5.00 g of the coprecipitate, 2.64 g of lithium carbonate, and 0.480 g of potassium sulfate were dry mixed by using an agate mortar, affording a mixture. Subsequently, the mixture was put into a calcination container made of alumina, kept at 850° C. for 6 hours in the atmosphere by using an electric furnace to calcine the mixture, and cooled to room temperature, so that a calcined product, was obtained. The resultant was pulverized, washed with distilled water by decantation, filtered, and then dried at 100° C. for 8 hours, so that a powdery positive electrode active material R² was obtained.

The compositional analysis of the R² revealed that the molar ratio of Li:Ni:Mn was 1.1:0.50:0.50. The powder X-ray diffraction analysis measurement revealed that the crystal structure of the above-mentioned R² was a layered structure assigned to an R-3m space group.

A coin type cell was produced using the R² and was subjected to a 25° C. cycle test, so that the initial discharge capacitance (mAh/g) was found to be 149 and the discharge capacitance maintenance factor (%) was found to be 70.6. The discharge capacitance maintenance factor was lower than those of Examples 1 to 3 and Comparative Example 1 and no positive electrode active material capable of affording a nonaqueous electrolyte secondary battery excellent in discharge capacitance and cycling characteristics was obtained.

Production Example 1

Production of Laminated Film (1) Production of Coating Liquid

After 272.7 g of calcium chloride had been dissolved in 4200 g of NMP, 132.9 g of paraphenylenediamine was added and completely dissolved. To the resultant solution was gradually added 243.3 g of terephthaloyl dichloride to be polymerized, so that para-aramide was obtained, and this was further diluted with NMP, so that para-aramide solution (A) having a concentration of 2.0% by weight was obtained. To the resultant para-aramide solution (100 g) were added 2 g of an alumina powder (a) (alumina C, produced by Japan Aerosil Inc., average particle diameter: 0.02 μm) and 2 g of an alumina powder (b) (Sumicorundum AA03, produced by Sumitomo Chemical Co., Ltd., average particle diameter: 0.3 μm), 4 g in total, and mixed as fillers, and the resultant was processed with a NANOMIZER three times, and further filtered with a wire gauze with 1000 meshes, and then defoamed under reduced pressure, so that a slurry-like coating liquid (B) was produced. The weight of the alumina powder (filler) relative to the total weight of the para-aramide and the alumina powder was 67% by weight.

(2) Production and Evaluation of Laminated Film

A polyethylene porous membrane (thickness: 12 μm, gas permeability: 140 seconds/100 cc, average pore diameter: 0.1 μm, porosity: 50%) was used as a porous film. The polyethylene porous membrane was secured onto a PET film having a thickness of 100 μm, and the slurry-like coating liquid (B) was applied onto the porous membrane by using a bar coater manufactured by Tester Sangyo Co., Ltd. The PET film and the coated porous membrane placed thereon were immersed into water, which was a poor solvent, while being integrally kept, so that a para-aramide porous membrane (heat-resistant layer) was deposited thereon, and the solvent was then dried, so that laminated film 1 having the heat-resistant porous layer and the porous film laminated thereon was obtained. The thickness of the laminated film was 16 μm, and the thickness of the para-aramide porous membrane (heat-resistant porous layer) was 4 μm. The gas permeability of the laminated film was 180 seconds/100 cc, and the porosity thereof was 50%. The observation of the cross section of the heat-resistant porous layer in the laminated film by a scanning electron microscope (SEM) found that comparatively small fine pores as small as about 0.03 μm to 0.06 μm and comparatively large fine pares as large as about 0.1 μm to 1 μm were present. Laminate films were evaluated by the following methods.

<Evaluation of a Laminated Film>

(A) Measurement of Thickness

The thickness of a laminated film and the thickness of a porous film were measured in accordance with JIS (K7130-1992). A value obtained by subtracting the thickness of the porous film from the thickness of the laminated film was used as the thickness of a heat-resistant porous layer.

(B) Measurement of Air Permeability by Gurley Method

The air permeability of a laminated film was measured using a Gurley densometer with a digital timer manufactured by Yasuda Seiki Seisakusho Ltd. on the basis of JIS P 8117.

(C) Porosity

A sample of a laminated film obtained was cut into a square 10 cm on each side, and the weight W (g) and the thickness D (cm) thereof were measured. The weight of each layer in the sample (Wi (g)) (i=1 to n) was measured and the volume of each layer was calculated from Wi and the true specific gravity (true specific gravity i (g/cm³)) of the material of each layer. Then, the porosity (volume %) was calculated from the following formula:

Porosity (% by volume)=100×{1−(W1/(true specific gravity 1)+W2/(true specific gravity 2)+ . . . +Wn/(true specific gravity n))/(10×10×D)}

In each of the above-described Examples, the use of the laminated porous film obtained by Production Example 1 as a separator makes it possible to obtain a lithium secondary battery capable of increasing thermal film destruction temperature.

INDUSTRIAL APPLICABILITY

According to the present invention, a positive electrode active material can be obtained which is capable of affording a nonaqueous electrolyte secondary battery excellent in cycling characteristics.

The invention claimed is:

1. A positive electrode active material that is represented by the following formula (I) and has a BET specific surface area of larger than 5 m²/g and not larger than 15 m²/g:

$$Li_xM^1{}_yM^3{}_{1-y}O_2 \tag{I}$$

wherein M¹ is V, M³ is the both of Ni and Mn, x is not less than 0.9 and not more than 1.3, and y is more than 0 and not more than 0.01.

2. A positive electrode comprising the positive electrode active material according to claim 1.

3. A nonaqueous electrolyte secondary battery comprising the positive electrode according to claim 2.

* * * * *